United States Patent
Heng et al.

(12)

(10) Patent No.: US 11,068,396 B2
(45) Date of Patent: Jul. 20, 2021

(54) SYSTEM AND METHOD FOR BALANCE LOCALIZATION AND PRIORITY OF PAGES TO FLUSH IN A SEQUENTIAL LOG

(71) Applicant: EMC IP Holding Company, LLC, Hopkinton, MA (US)

(72) Inventors: Socheavy D. Heng, Framingham, MA (US); William C. Davenport, San Diego, CA (US); Joris Johannes Wils, Framingham, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/528,836

(22) Filed: Aug. 1, 2019

(65) Prior Publication Data
US 2021/0034518 A1 Feb. 4, 2021

(51) Int. Cl.
*G06F 12/08* (2016.01)
*G06F 12/0804* (2016.01)
*G06F 12/1009* (2016.01)

(52) U.S. Cl.
CPC ...... *G06F 12/0804* (2013.01); *G06F 12/1009* (2013.01); *G06F 2212/1032* (2013.01)

(58) Field of Classification Search
CPC ............. G06F 12/0804; G06F 12/1009; G06F 2212/1032

USPC .......................................................... 711/143
See application file for complete search history.

(56) References Cited

U.S. PATENT DOCUMENTS

| | | | |
|---|---|---|---|
| 10,163,510 B1 * | 12/2018 | Giles ................... | G06F 12/0897 |
| 2003/0033440 A1 * | 2/2003 | Hickson ................. | H04L 43/00 719/313 |
| 2010/0211554 A1 * | 8/2010 | Reid .................... | G06F 16/2358 707/703 |
| 2014/0089265 A1 * | 3/2014 | Talagala ................ | G06F 16/22 707/674 |
| 2018/0260136 A1 * | 9/2018 | Huo ........................ | G06F 3/068 |

* cited by examiner

*Primary Examiner* — Hiep T Nguyen
(74) *Attorney, Agent, or Firm* — Brian J. Colandreo; Mark H. Whittenberger; Holland & Knight LLP

(57) ABSTRACT

A method, computer program product, and computer system for staging writes into a log in chronological order, wherein each write may have a log record of a plurality of log records describing data of the write. The log record may be organized into a bucket of a plurality of buckets associated with a range of a plurality of ranges within a backing store, wherein each bucket of the plurality of buckets may include two keys respectively. The log record of the plurality of log records may be flushed from the bucket of the plurality of buckets to the backing store at a location and in an order determined based upon, at least in part, the two keys included with the bucket.

14 Claims, 9 Drawing Sheets

900

SYSTEM AND METHOD FOR BALANCE LOCALIZATION AND PRIORITY OF PAGES TO FLUSH IN A SEQUENTIAL LOG

BACKGROUND

Generally, a transaction log may be a staging area for incoming dirty data, and the dirty data may be flushed to a backing store in the background. The log may be sequential in nature where writes landing in the log rings may be chronologically ordered. Although the writes to the log are sequential, the actual destination Logical Block Address (LBA) of the backing store may be random.

BRIEF SUMMARY OF DISCLOSURE

In one example implementation, a method, performed by one or more computing devices, may include but is not limited to staging writes into a log in chronological order, wherein each write may have a log record of a plurality of log records describing data of the write. The log record may be organized into a bucket of a plurality of buckets associated with a range of a plurality of ranges within a backing store, wherein each bucket of the plurality of buckets may include two keys respectively. The log record of the plurality of log records may be flushed from the bucket of the plurality of buckets to the backing store at a location and in an order determined based upon, at least in part, the two keys included with the bucket.

One or more of the following example features may be included. The log record may include a destination logical block address (LBA) of the backing store associated with the range within the backing store. The log record may include a log sequence number (LSN). A first key of the two keys may include a starting LBA of the range within the backing store. The first key of the two keys may be used to one of reference the bucket and create a new bucket if the bucket does not exist. A second key of the two keys may include a lowest log sequence number of any records within the bucket. The second key may be used to create a tree for flush ordering.

In another example implementation, a computing system may include one or more processors and one or more memories configured to perform operations that may include but are not limited to staging writes into a log in chronological order, wherein each write may have a log record of a plurality of log records describing data of the write. The log record may be organized into a bucket of a plurality of buckets associated with a range of a plurality of ranges within a backing store, wherein each bucket of the plurality of buckets may include two keys respectively. The log record of the plurality of log records may be flushed from the bucket of the plurality of buckets to the backing store at a location and in an order determined based upon, at least in part, the two keys included with the bucket.

One or more of the following example features may be included. The log record may include a destination logical block address (LBA) of the backing store associated with the range within the backing store. The log record may include a log sequence number (LSN). A first key of the two keys may include a starting LBA of the range within the backing store. The first key of the two keys may be used to one of reference the bucket and create a new bucket if the bucket does not exist. A second key of the two keys may include a lowest log sequence number of any records within the bucket. The second key may be used to create a tree for flush ordering.

In another example implementation, a computer program product may reside on a computer readable storage medium having a plurality of instructions stored thereon which, when executed across one or more processors, may cause at least a portion of the one or more processors to perform operations that may include but are not limited to staging writes into a log in chronological order, wherein each write may have a log record of a plurality of log records describing data of the write. The log record may be organized into a bucket of a plurality of buckets associated with a range of a plurality of ranges within a backing store, wherein each bucket of the plurality of buckets may include two keys respectively. The log record of the plurality of log records may be flushed from the bucket of the plurality of buckets to the backing store at a location and in an order determined based upon, at least in part, the two keys included with the bucket.

One or more of the following example features may be included. The log record may include a destination logical block address (LBA) of the backing store associated with the range within the backing store. The log record may include a log sequence number (LSN). A first key of the two keys may include a starting LBA of the range within the backing store. The first key of the two keys may be used to one of reference the bucket and create a new bucket if the bucket does not exist. A second key of the two keys may include a lowest log sequence number of any records within the bucket. The second key may be used to create a tree for flush ordering.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
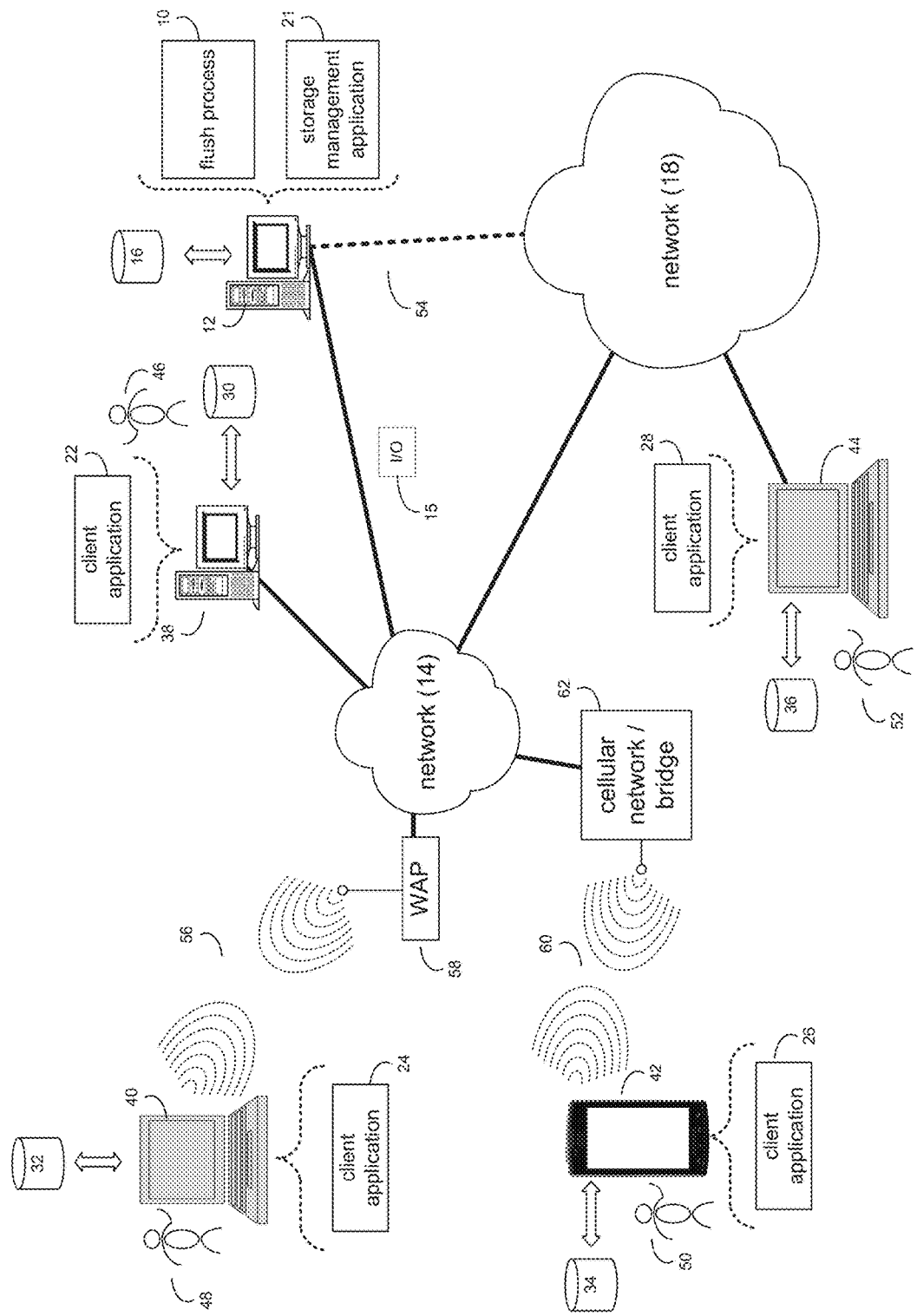
FIG. 1 is an example diagrammatic view of a flush process coupled to an example distributed computing network according to one or more example implementations of the disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown flush process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a flush process, such as flush process 10 of FIG. 1, may stage writes into a log in chronological order, wherein each write may have a log record of a plurality of log records describing data of the write. The log record may be organized into a bucket of a plurality of buckets associated with a range of a plurality of ranges within a backing store, wherein each bucket of the plurality of buckets may include two keys respectively. The log record of the plurality of log records may be flushed from the bucket of the plurality of buckets to the backing store at a location and in an order determined based upon, at least in part, the two keys included with the bucket.

In some implementations, the instruction sets and subroutines of flush process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, flush process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, flush process 10 and/or storage management application 21 may be accessed via one or more of client applications 22, 24, 26, 28. In some implementations, flush process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within flush process 10, a component of flush process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of flush process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of flush process 10 (and vice versa). Accordingly, in some implementations, flush process 10 may be a purely server-side application, a purely client-side application, or a hybrid server-side/client-side application that is cooperatively executed by one or more of client applications 22, 24, 26, 28 and/or flush process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, flush process 10, and storage management application 21, taken singly or in any combination, may effectuate some or all of the same functionality, any description of effectuating such functionality via one or more of client applications 22, 24, 26, 28, flush process 10, storage management application 21, or combination thereof, and any described interaction(s) between one or more of client applications 22, 24, 26, 28, flush process 10, storage management application 21, or combination thereof to effectuate such functionality, should be taken as an example only and not to limit the scope of the disclosure.

In some implementations, one or more of users 46, 48, 50, 52 may access computer 12 and flush process 10 (e.g., using one or more of client electronic devices 38, 40, 42, 44) directly through network 14 or through secondary network 18. Further, computer 12 may be connected to network 14 through secondary network 18, as illustrated with phantom link line 54. Flush process 10 may include one or more user interfaces, such as browsers and textual or graphical user interfaces, through which users 46, 48, 50, 52 may access flush process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
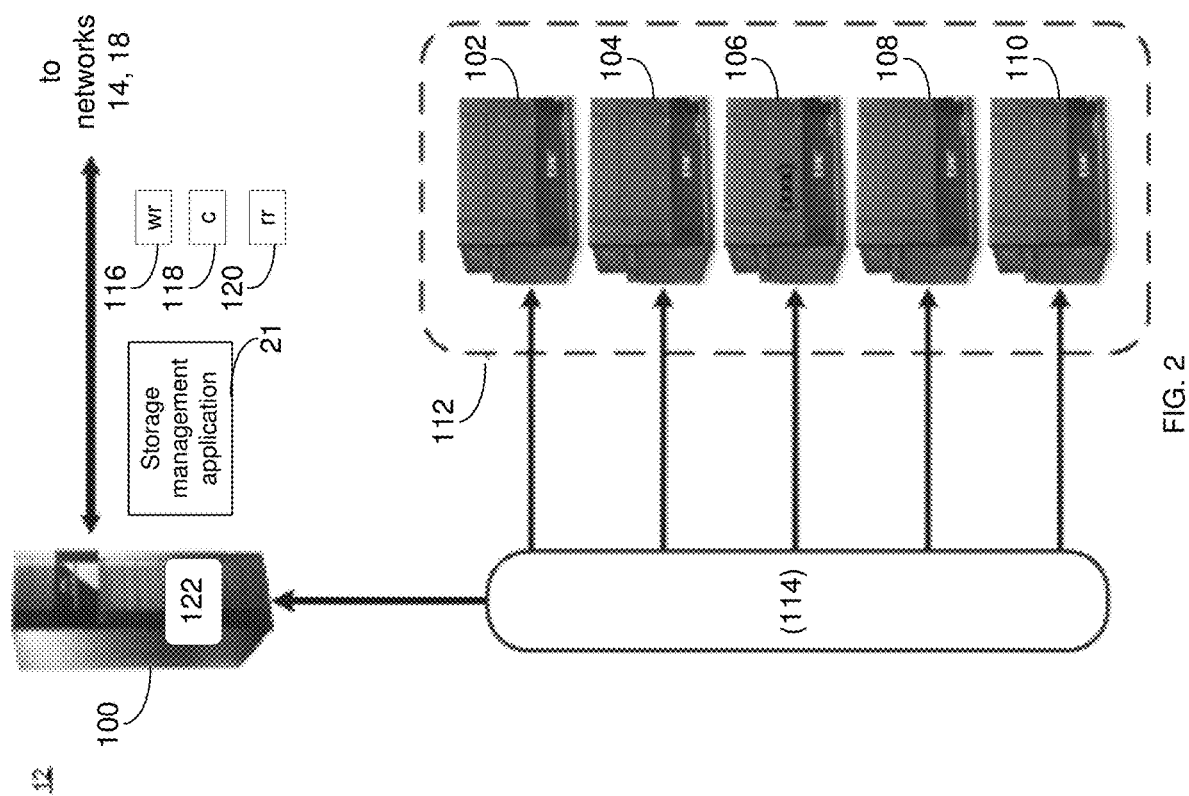
FIG. 2 is an example diagrammatic view of a storage system of FIG. 1 according to one or more example implementations of the disclosure.
Figure 3:
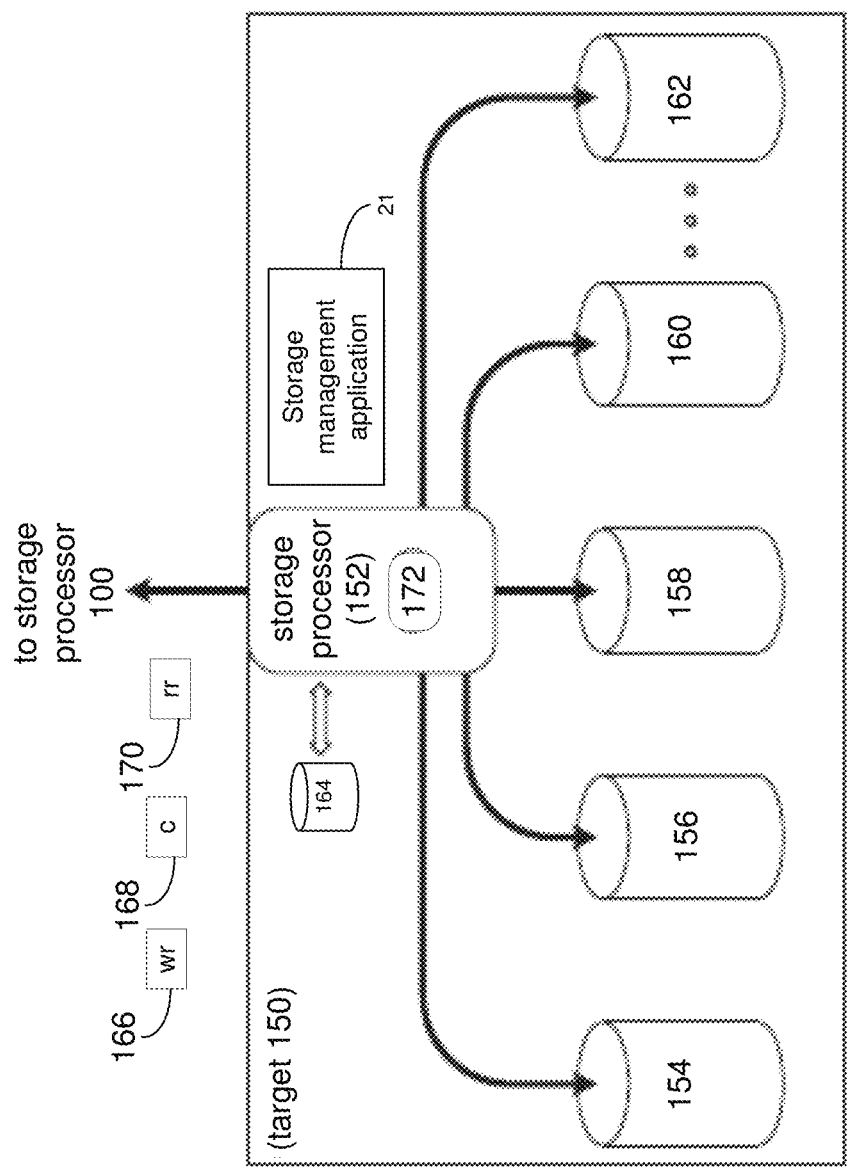
FIG. 3 is an example diagrammatic view of a storage target of FIG. 1 according to one or more example implementations of the disclosure.
Figure 4:
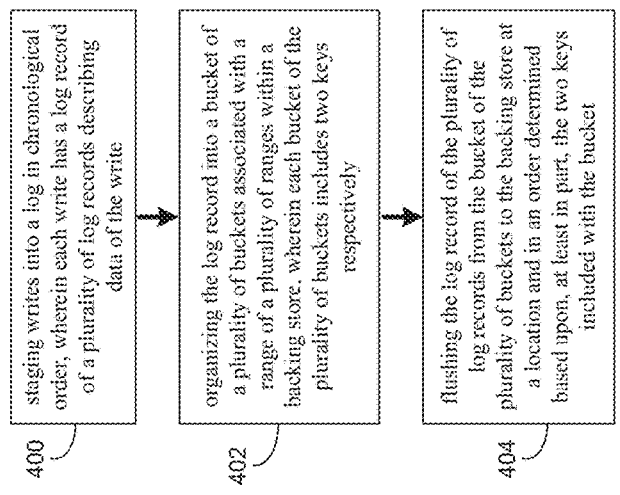
FIG. 4 is an example flowchart of a flush process according to one or more example implementations of the disclosure.
Figure 5:
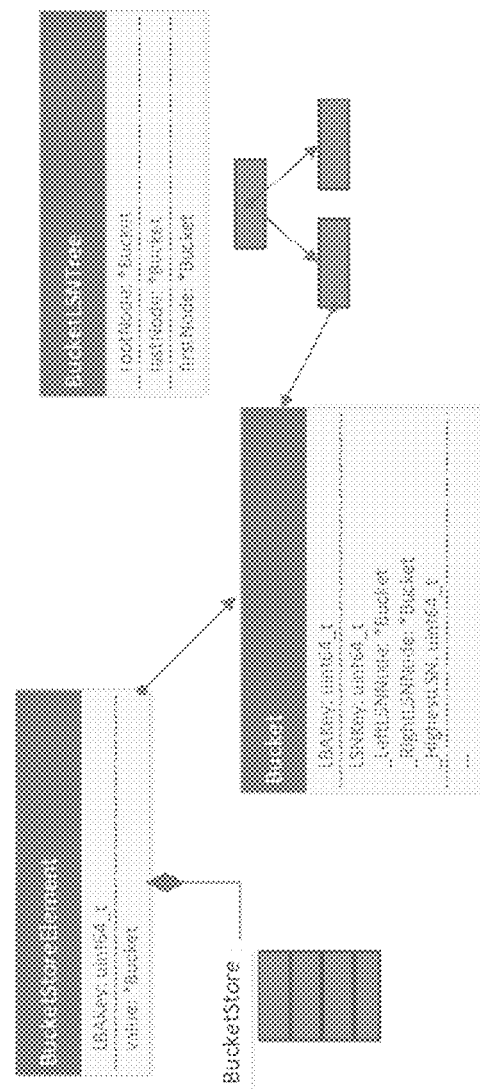
FIG. 5 is an example diagrammatic view of a bucket data structure according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX system offered by Dell EMC of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or flush process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX system offered by Dell EMC of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Generally, a transaction log may be a staging area for incoming dirty data, and the dirty data may be flushed to a backing store in the background. The log may be sequential in nature where writes landing in the log rings may be chronologically ordered. Although the writes to the log are sequential, the actual destination Logical Block Address (LBA) of the backing store may be random. As will be discussed below, the present disclosure may provide a solution to balance the importance of the log ring's tail movement along with the localization of pages during the flush.

The Flush Process:

As discussed above and referring also at least to the example implementations of FIGS. 4-9, flush process 10 may stage 400 writes into a log in chronological order, wherein each write may have a log record of a plurality of log records describing data of the write. Flush process 10 may organize 402 the log record into a bucket of a plurality of buckets associated with a range of a plurality of ranges within a backing store, wherein each bucket of the plurality of buckets may include two keys respectively. Flush process 10 may flush 404 the log record of the plurality of log records from the bucket of the plurality of buckets to the backing store at a location and in an order determined based upon, at least in part, the two keys included with the bucket.

In some implementations, flush process 10 may stage 400 writes into a log in chronological order, wherein each write may have a log record of a plurality of log records describing data of the write. For example, incoming writes may be staged 400 into a log in sequential order. In some implementations, the log record may include a destination logical block address (LBA) of the backing store associated with the range within the backing store, as well as a log sequence number (LSN). For example, each write may have a record describing the data. Such information may include, e.g., the destination LBA of the backing store when the write is de-staged from the log, as well as a monotonically increasing LSN that may define the record's location in the log (e.g., circular log ring) as well as its chronological order within the ring.

In some implementations, flush process 10 may organize 402 the log record into a bucket of a plurality of buckets associated with a range of a plurality of ranges within a backing store, wherein each bucket of the plurality of buckets may include two keys respectively. For example, the log records may be organized 402 into buckets that pertain to a particular logical range within the backing store. The logical range that each bucket covers may be of the same size. In some implementations, a first key of the two keys may include a starting LBA of the range within the backing store, and the first key of the two keys may be used to one of reference the bucket and create a new bucket if the bucket does not exist. For example, the buckets may contain two keys, one of which may be the starting LBA of the LBA range the bucket will cover. An example bucket store keyed/hashed by the LBA may be used to reference a bucket when adding records into an existing bucket, or creating a new bucket when a corresponding bucket does not exist. These buckets may localize pages into LBA ranges that may be optimized for the backing store.

In some implementations, flush process 10 may flush 404 the log record of the plurality of log records from the bucket of the plurality of buckets to the backing store at a location and in an order determined based upon, at least in part, the two keys included with the bucket, where a second key of the two keys may include a lowest log sequence number of any records within the bucket, which may be used to create a tree for flush ordering. For example, another key may be the lowest Log Sequence Number (LSN) of the records within the bucket. This key may be used to create the LSNTree for flush ordering. During the flush, the records from the pages may be taken from the buckets with the lowest LSN from the LSNTree, thus maintaining priority on tail movement while also localizing pages. The records belonging to a bucket may be chained through the LSNKey, which may be the lowest LSN and chronologically first record in the bucket. Referring at least to the example implementation of FIG. 5, a high level overview of the bucket data structures 500 is shown that may be used for the lookup of the classification of the records into buckets and the organization of the buckets for flush 404 ordering.

Figure 6:
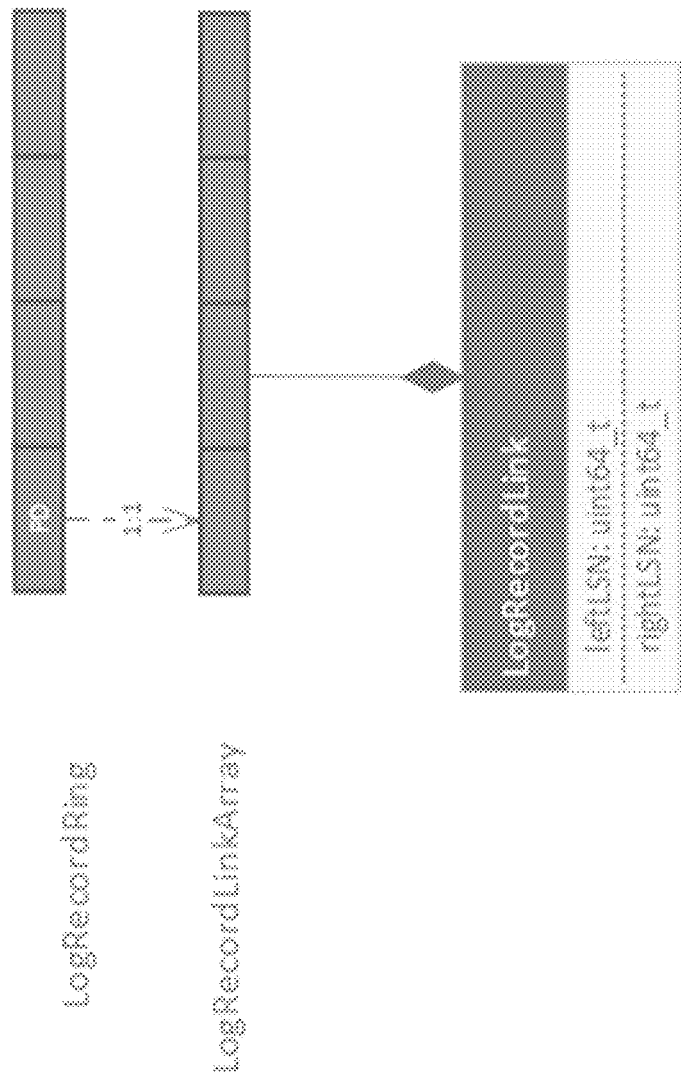
FIG. 6 is an example diagrammatic view of a data structure used for a chain/list of records according to one or more example implementations of the disclosure.

Referring also to the example implementation of FIG. 6, an example data structure 600 used for a chain/list of records in buckets is shown. In the example, the LSNKey may be the lowest LSN in the bucket. The LogRecordLinkArray may be an array containing link data for each log record. Similarly to how the LSN self describes the element's location within the ring, the index of each element within the LogRecordLinkArray may mathematically corresponds to a particular LSN. LogRecordLink may contain a previous LSN or may be invalid if none exists and a next LSN or may be invalid if none exists. Starting with the LSNKey of a bucket, the corresponding LogRecordLinks may thus form a linked list describing a chain of log records belonging to a particular bucket in LSN order.

Figure 7:
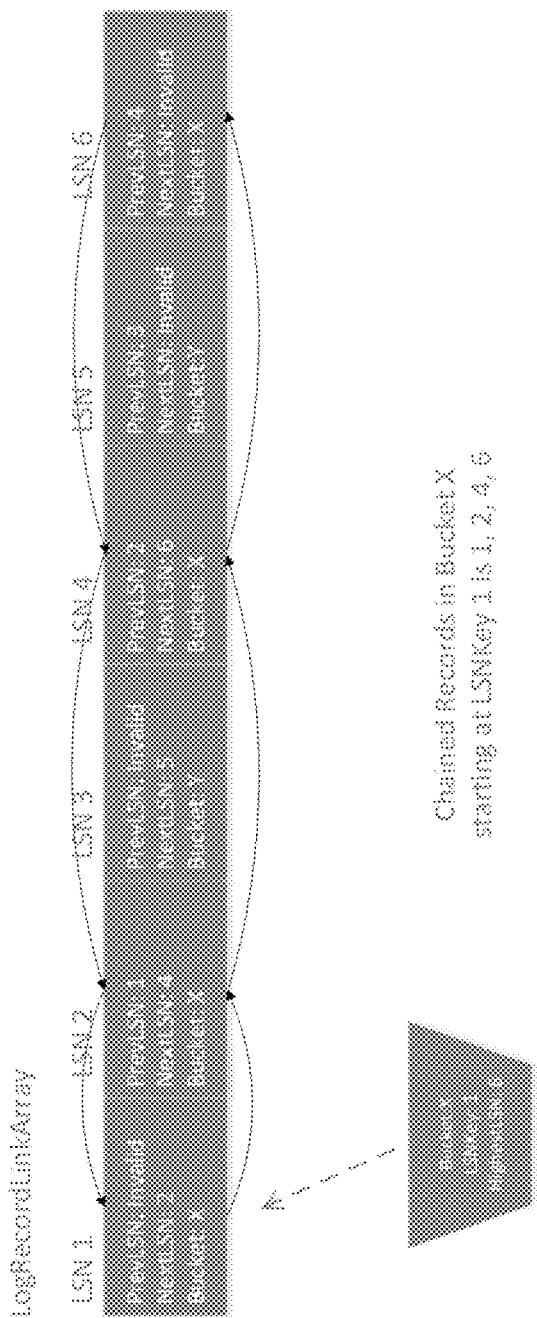
FIG. 7 is an example diagrammatic view of a chain of records according to one or more example implementations of the disclosure.

Referring at least to the example implementation of FIG. 7, an example of a chain of records 700 in a bucket is shown. The chain may be essentially a double linked list within an array in which the indices correspond to a particular LSN. The bucket's LSNKey may be the first record with the chain.

In some implementations, records may be classified from the log ring into buckets during background processing in order to save on memory, throttle how much preference is given to records that occur later in time, and ease of implementation for maintaining proper ordering on LSN in the LogRecordLink chain. It may be possible to classify records on ingest. When the log record is classified, they may be processed in chronological LSN order. A lookup may be done into the bucket store, which may be a hash table or a tree for example. The lookup may involve calculating the target bucket LBAkey from the record's LBA with the equation such as, e.g., int(recordLBA/BucketSize)*BucketSize. For example, if a bucket were of size 10 and the LBA of a record was 22, the LBAKey of the target bucket may be 20. If the LBA of a record was 2, the LBAKey of the target bucket may be 0. The lookup into the bucket store may yield a valid pointer to the target bucket or NULL if the target bucket is not found. If a bucket is found in the bucket store, the record may be added to the existing bucket by adding a LogRecordLink to the highest LSN within the bucket.

Figure 8:
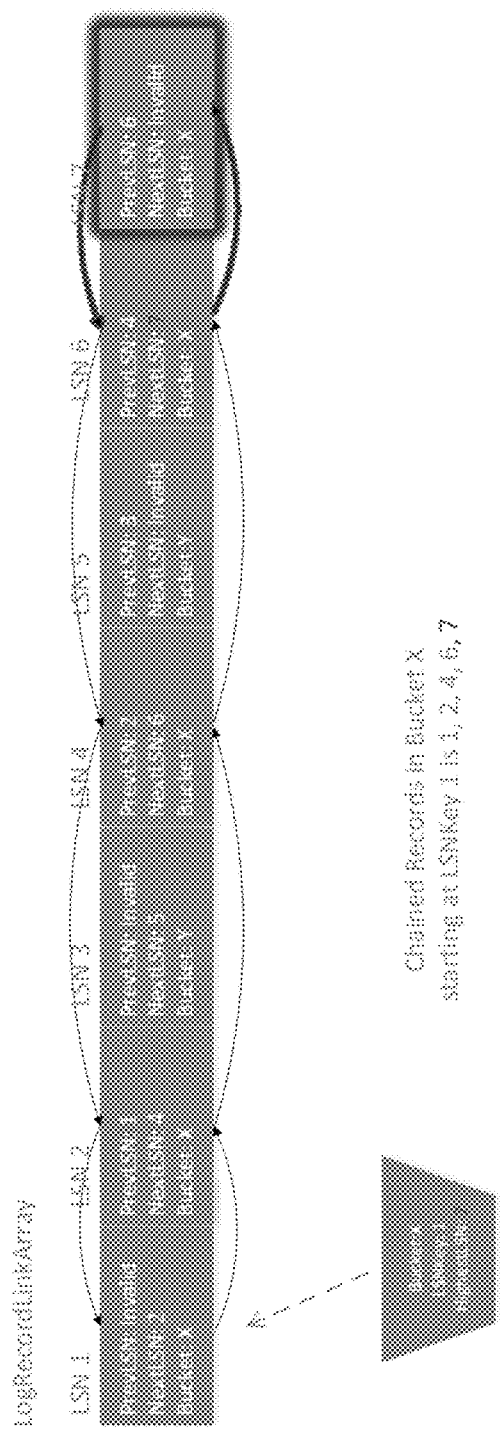
FIG. 8 is an example diagrammatic view of a general flow for classifying log records and adding buckets into an LSNTree according to one or more example implementations of the disclosure.

For example, and referring to the example implementation of FIG. 8, which builds upon FIG. 7, it is demonstrated the changes required if a new record at LSN 7 was to be added to the chain. In the example, the NextLSN of LogRecordLink at LSN/index 6 may be set to 7, the PrevLSN of LogRecordLink at LSN/index 7 may be set to 6, and the HighestLSN of bucket X may be set to 7. The chain of records in bucket X may thus become 1, 2, 4, 6, 7. The tree does not need to be rebalanced since the LSNKey does not change and no new nodes are added. However, if no bucket is found in the bucket store, a new bucket may be created, the LSNKey and HighestLSN may be set to the LSN of the log record, the corresponding LogRecordLink may get initialized where PrevLSN and NextLSN are set to invalid, the bucket pointer may be set within the LogRecordLink, the bucket may be added to the bucket store, and the bucket may be added into the LSN Tree. The tree may need to be rebalanced periodically either on insertion or deletion, since adding and deleting nodes may create an imbalanced tree. The general flow 800 for classifying log records and adding buckets into the LSNTree is shown in FIG. 8.

Figure 9:
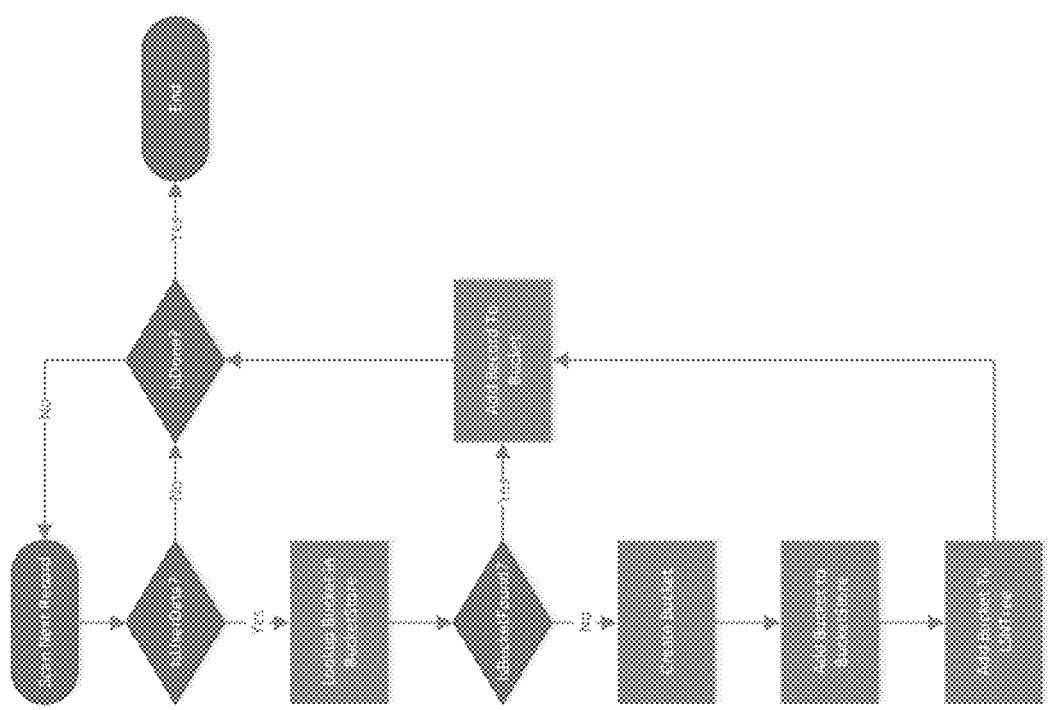
FIG. 9 is an example flowchart of a flush process according to one or more example implementations of the disclosure.

Referring at least to the example implementation of FIG. 9, an example flowchart 900 associated with flush process 10 is shown. In some implementations, on the flush 404, the buckets may be processed from the LSNTree in LSNKey order, thus maintaining priority on the tail movement and the records within the buckets may also be localized to the LBA range of that bucket. Records may be removed from the LogRecordLink chain as they are flushed and buckets may be removed from the LSN Tree as they become empty. Records may be removed from the chain by, e.g., a look up within the LogRecordLinkArray, and setting the previous and next records' pointers to point to each other for PrevLSN and NextLSN values, which may be done in the same manner as removing an element in a doubly linked list. Checks on the bucket's LSNKey and HighestLSN should be done prior to modifying the chain. If the record to be removed is the LSNKey and the HighestLSN, this may indicate that this is the last record within the bucket and the bucket may need to be removed from the LSNTree and the bucket store. If the record is at the HighestLSN only, the record's PrevLSN should be set as the HighestLSN to ensure if new records are added, they are added appropriately to the chain. If the record is at the LSNKey only, this may indicate that the record's NextLSN should be set as the LSNKey and a rebalance of the LSNTree may be required. If the record is neither the LSNKey nor the HighestLSN, then the bucket does not necessarily need to be modified and removing the record from the chain may suffice.

Thus, the use of buckets may allow for a logical range to be localized within a flush 404 to the backing store efficiently when there are numerous records within the log. The organization of the buckets by lowest LSN within the LSNTree may allow for priority on flushing 404 the tail of the log.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   staging writes into a log in chronological order, wherein each write has a log record of a plurality of log records describing data of the write;
   organizing each of the log records of the plurality of log records into a bucket of a plurality of buckets associated with a range of a plurality of ranges within a backing store, wherein each bucket of the plurality of buckets includes a first key and a second key respectively;
   creating a tree, wherein the tree is based upon, at least in part, the second key, wherein the second key includes a lowest log sequence number (LSN) of one or more log records of the plurality of log records, wherein the tree includes one or more LSNs of the one or more log records; and
   flushing one or more log records of the plurality of log records from one or more buckets of the plurality of buckets to the backing store at a location and in an order determined based upon, at least in part, the first key, the second key, and one or more lowest LSNs from the tree.

2. The computer-implemented method of claim 1 wherein the log record includes a destination logical block address (LBA) of the backing store associated with the range within the backing store.

3. The computer-implemented method of claim 1 wherein the log record includes a log sequence number (LSN).

4. The computer-implemented method of claim 1 wherein a first key of the two keys includes a starting LBA of the range within the backing store.

5. The computer-implemented method of claim 4 wherein the first key of the two keys is used to one of reference the bucket and create a new bucket if the bucket does not exist.

6. A computer program product residing on a non-transitory computer readable storage medium having a plurality of instructions stored thereon which, when executed across one or more processors, causes at least a portion of the one or more processors to perform operations comprising:
   staging writes into a log in chronological order, wherein each write has a log record of a plurality of log records describing data of the write;
   organizing each of the log records of the plurality of log records into a bucket of a plurality of buckets associated with a range of a plurality of ranges within a backing store, wherein each bucket of the plurality of buckets includes a first key and a second key respectively;
   creating a tree, wherein the tree is based upon, at least in part, the second key, wherein the second key includes a lowest log sequence number (LSN) of one or more log records of the plurality of log records, wherein the tree includes one or more LSNs of the one or more log records; and
   flushing one or more log records of the plurality of log records from one or more buckets of the plurality of buckets to the backing store at a location and in an order determined based upon, at least in part, the first key, the second key, and one or more lowest LSNs from the tree.

7. The computer program product of claim 6 wherein the log record includes a destination logical block address (LBA) of the backing store associated with the range within the backing store.

8. The computer program product of claim 6 wherein the log record includes a log sequence number (LSN).

9. The computer program product of claim 6 wherein a first key of the two keys includes a starting LBA of the range within the backing store.

10. The computer program product of claim 9 wherein the first key of the two keys is used to one of reference the bucket and create a new bucket if the bucket does not exist.

11. A computing system including one or more processors and one or more memories configured to perform operations comprising:
    staging writes into a log in chronological order, wherein each write has a log record of a plurality of log records describing data of the write;
    organizing each of the log records of the plurality of log records into a bucket of a plurality of buckets associated with a range of a plurality of ranges within a backing store, wherein each bucket of the plurality of buckets includes a first key and a second key respectively;
    creating a tree, wherein the tree is based upon, at least in part, the second key, wherein the second key includes a lowest log sequence number (LSN) of one or more log records of the plurality of log records, wherein the tree includes one or more LSNs of the one or more log records; and
    flushing one or more log records of the plurality of log records from one or more buckets of the plurality of buckets to the backing store at a location and in an order determined based upon, at least in part, the first key, the second key, and one or more lowest LSNs from the tree.

12. The computing system of claim 11 wherein the log record includes a destination logical block address (LBA) of the backing store associated with the range within the backing store, and wherein the log record includes a log sequence number (LSN).

13. The computing system of claim 11 wherein a first key of the two keys includes a starting LBA of the range within the backing store.

14. The computing system of claim 13 wherein the first key of the two keys is used to one of reference the bucket and create a new bucket if the bucket does not exist.

* * * * *